United States Patent
Fan et al.

(10) Patent No.: US 10,602,564 B2
(45) Date of Patent: Mar. 24, 2020

(54) USER EQUIPMENT AND CONTROL CHANNEL MONITORING METHOD THEREOF, NETWORK NODE AND CONTROL CHANNEL CONFIGURATION AND TRANSMISSION METHOD THEREOF

(71) Applicant: Telefonaktiebolaget LM Ericsson (publ), Stockholm (SE)

(72) Inventors: Rui Fan, Beijing (CN); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/516,104

(22) PCT Filed: Aug. 31, 2016

(86) PCT No.: PCT/CN2016/097619
§ 371 (c)(1),
(2) Date: Mar. 31, 2017

(87) PCT Pub. No.: WO2018/040001
PCT Pub. Date: Mar. 8, 2018

(65) Prior Publication Data
US 2018/0235024 A1    Aug. 16, 2018

(51) Int. Cl.
*H04W 52/00* (2009.01)
*H04W 76/27* (2018.01)
(Continued)

(52) U.S. Cl.
CPC .............. *H04W 76/27* (2018.02); *H04L 5/00* (2013.01); *H04L 5/0048* (2013.01);
(Continued)

(58) Field of Classification Search
CPC ... H04W 72/042; H04W 76/27; H04W 24/08; H04W 48/12; H04W 76/28;
(Continued)

(56) References Cited

U.S. PATENT DOCUMENTS 8,964,611 B2 * 2/2015 Das ................... H04W 52/0229
370/311
9,066,350 B2 * 6/2015 Sammour ........... H04W 76/048
(Continued)

FOREIGN PATENT DOCUMENTS

CN       101932023 A     12/2010
CN       103095424 A      5/2013
(Continued)

OTHER PUBLICATIONS

PCT Notification of Transmittal of the International Search Report and the Written Opinion of the International Searching Authority, or the Declaration for International application No. PCT/CN2016/097619—dated Jun. 6, 2017.

*Primary Examiner* — Phuc H Tran
(74) *Attorney, Agent, or Firm* — Baker Botts, LLP

(57) ABSTRACT

The present disclosure provides a control channel monitoring method at a UE, comprising: monitoring only a first type of control channel in a first state of the UE; if first control information which indicates data required by the UE in the first state on a data channel is detected on the first type of control channel, decoding the first control information in order to obtain the data required by the UE in the first state on the data channel; and monitoring only a second type of control channel when the UE is in a second state which is transited from the first state. The present disclosure also provides a corresponding UE, a control channel configuration and transmission method at a network node, and a corresponding network node.

11 Claims, 4 Drawing Sheets

(51) Int. Cl.
  *H04L 5/00* (2006.01)
  *H04W 76/28* (2018.01)
  *H04W 24/08* (2009.01)
  *H04W 72/04* (2009.01)
  *H04W 48/12* (2009.01)

(52) U.S. Cl.
  CPC ......... *H04W 24/08* (2013.01); *H04W 72/042* (2013.01); *H04W 76/28* (2018.02); *H04W 48/12* (2013.01)

(58) Field of Classification Search
  CPC .. H04W 72/1289; H04W 74/006; H04L 5/00; H04L 5/0048
  See application file for complete search history.

(56) References Cited

U.S. PATENT DOCUMENTS

| | | | |
|---|---|---|---|
| 2005/0153751 A1* | 7/2005 | Bultan | H04W 52/0248 455/574 |
| 2014/0036858 A1* | 2/2014 | Shimezawa | H04W 72/042 370/329 |
| 2015/0304086 A1 | 10/2015 | Kim et al. | |

FOREIGN PATENT DOCUMENTS

| | | |
|---|---|---|
| CN | 103493562 A | 1/2014 |
| WO | 2013025677 A2 | 2/2013 |

\* cited by examiner

USER EQUIPMENT AND CONTROL CHANNEL MONITORING METHOD THEREOF, NETWORK NODE AND CONTROL CHANNEL CONFIGURATION AND TRANSMISSION METHOD THEREOF

PRIORITY

This nonprovisional application is a U.S. National Stage Filing under 35 U.S.C. § 371 of International Patent Application Serial No. PCT/CN2016/097619 filed Aug. 31, 2016, and entitled "User Equipment And Control Channel Monitoring Method Thereof Network Node And Control Channel Configuration And Transmission Method Thereof."

TECHNICAL FIELD

The present disclosure generally relates to the technical field of telecommunication, and particularly to a control channel monitoring method and a user equipment (UE) using the control channel monitoring method, as well as a control channel configuration and transmission method and a network node using the control channel configuration and transmission method.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Long-Term Evolution (LTE), a UE has two Radio Resource Control (RRC) states, i.e., a RRC_Idle state and a RRC_Connected state, and has two types of downlink control channels, i.e., Physical Downlink Control Channel (PDCCH) and Enhanced Physical Downlink Control Channel (E-PDCCH), to schedule a data channel, i.e., to indicate data required by the UE on the data channel.

In the RRC_Idle state, information to be received by the UE may include non-UE-dedicated information, such as system information, paging, and Message 2 (MSG2) in a random access procedure etc. In the RRC_Connected state, information to be received by UE may include not only UE-dedicated information, but also the non-UE-dedicated information.

Decoding of the PDCCH by the UE is based on a cell reference signal (CRS) and therefore the PDCCH cannot be beamformed to the UE. Due to this shortcoming, the E-PDCCH is introduced. The E-PDCCH can be beamformed to the UE as decoding of the E-PDCCH is based on a demodulation reference signal (DMRS) which is UE specific.

When UEs are in their RRC_Idle state, the downlink control channel used to schedule the data channel can only be PDCCH, as the network node won't need to tell one from another among those UEs and corresponding E-PDCCHs are not configured for now. Therefore, the E-PDCCH cannot be used in UE's RRC_Idle state.

In the RRC_Connected state, the downlink control channel used to schedule the downlink data channel depends on whether the UE is configured with E-PDCCH or not. If the E-PDCCH is not configured, the PDCCH is still used to schedule the data channel. If the E-PDCCH is configured, both the PDCCH and the E-PDCCH are used to schedule the data channel. That is, in the RRC_Connected state, the UE still needs to monitor the PDCCH, even if the E-PDCCH is configured. This is due to two reasons. First, there is no common search space in the E-PDCCH, so when the UE in the RRC_Connected state needs to receive system information, paging etc., the UE still needs to monitor the PDCCH. Second, the E-PDCCH may collide with Master Information Block (MIB) or Primary Synchronization Signal (PSS)/Secondary Synchronization Signal (SSS) in some subframes, therefore in those subframes, the PDCCH is still needed to receive the UE-dedicated information. To summarize, although the E-PDCCH is an enhancement compared to the PDCCH, it cannot replace the PDCCH in the RRC_Connected state of the UE. The UE needs to monitor both the PDCCH and the E-PDCCH channels in the RRC_Connected state.

In a next generation of wireless communication network, a UE has three RRC states, i.e., a RRC_Idle state, a RRC_Active state and a RRC-Dormant state.

The RRC_Active state is similar to the RRC_Connected state in LTE, where there is UE context in a Radio Access Network (RAN) and mobility of the UE is network controlled. The RRC_Idle state is similar to the RRC_Idle state in LTE, where there is no UE context in the RAN and mobility of the UE is UE controlled. The RRC_Dormant state is a new state in the next generation of wireless communication network, where there is UE context in the RAN but mobility of the UE is UE controlled. In the RRC_Dormant state, the UE needs to receive paging, system information from RAN as the network does not know where the UE is.

The next generation of wireless communication network is based on an ultra-lean design whose intention is that as little mandatory transmissions as possible will be regulated. This implies that there will likely not be any CRS signals in the next generation of wireless communication network and hence no CRS-based PDCCH as LTE uses. Instead, downlink control channels in the next generation of wireless communication network need to be UE-configured and consist of definitions of a reference signal, a synchronization signal and a search space for reception of downlink control information.

Similar to LTE, a broadcast downlink control channel, e.g., a broadcast PDCCH (also referred to as a non-UE-dedicated PDCCH), is needed to receive broadcast information (also referred to as non-UE-dedicated information, e.g. system information, paging etc.) and a UE-dedicated downlink control channel, e.g., a UE-dedicated PDCCH, is needed to receive UE-dedicated information (also referred to as UE-dedicated information).

In the RRC_Active state, the UE still needs to receive UE-dedicated information via the dedicated PDCCH channel and to receive non-UE-dedicated information via the broadcast PDCCH channel. And in the RRC_Dormant state, some design mentioned that the UE may receive the UE-dedicated information via the dedicated PDCCH channel and the non-UE-dedicated information via the broadcast PDCCH channel as well.

However, if the design in the next generation of wireless communication network is similar with LTE, i.e. the UE is required to monitor more than one downlink control channel in some state, such as the RRC_Active state, or the RRC_Dormant state, it requires the UE to perform a substantial amount of processing, which consumes battery power.

Therefore, power consuming of the UE caused by the hypothesis mentioned above would be a concern for the next generation of wireless communication since battery power is a bottleneck of UE performance.

SUMMARY

An object of the present disclosure is to provide a downlink control channel configuration and transmission mechanism at the network node side and a downlink control channel monitoring mechanism at the UE side, so that the UE only needs to monitor one type of downlink control channel in any one of its states. Therefore, complexity of processing at the UE side may be reduced, and hence power consumption and cost of the UE may be reduced accordingly.

According to one aspect of the present disclosure, a method at a network node is provided. The method comprises: configuring first control information of a first type of control channel, which indicates data required by a UE in a first state on a data channel; and configuring second control information of a second type of control channel, which indicates data required by the UE in a second state on the data channel; and transmitting only the first control information on the first type of control channel to the UE, when the UE is in the first state; and transmitting only the second control information on the second type of control channel to the UE, when the UE enters the second state from the first state.

In an embodiment of the method, configuration information of the second type of control channel is included in the data required by the UE in the first state which are indicated by the first control information of the first type of control channel, before the UE enters the second state from the first state.

According to another aspect of the present disclosure, a network node is provided. The network node comprises: a configuration unit arranged to configure first control information of a first type of control channel, which indicates data required by a UE in a first state on a data channel; and configure second control information of a second type of control channel, which indicates data required by the UE in a second state on the data channel; and a transceiver arranged to transmit only the first control information on the first type of control channel to the UE, when the UE is in the first state; and transmit only the second control information on the second type of control channel to the UE, when the UE enters the second state from the first state.

In an embodiment of the network node, configuration information of the second type of control channel is included in the data required by the UE in the first state which are indicated by the first control information of the first type of control channel, before the UE enters the second state from the first state.

According to another aspect of the present disclosure, a network node is provided. The network node comprises: a communication interface arranged for wireless communication, one or more processors, and a memory including instructions which, when executed by said one or more processors, cause said network node to: configure first control information of a first type of control channel, which indicates data required by a UE in a first state on a data channel; and configure second control information of a second type of control channel, which indicates data required by the UE in a second state on the data channel; and transmit only the first control information on the first type of control channel to the UE, when the UE is in the first state; and transmit only the second control information on the second type of control channel to the UE, when the UE enters the second state from the first state.

In an embodiment of the network node, configuration information of the second type of control channel is included in the data required by the UE in the first state which are indicated by the first control information of the first type of control channel, before the UE enters the second state from the first state.

According to another aspect of the present disclosure, a method at a UE is provided. The method comprises: monitoring only a first type of control channel in a first state of the UE; if first control information which indicates data required by the UE in the first state on a data channel is detected on the first type of control channel, decoding the first control information in order to obtain the data required by the UE in the first state on the data channel; and monitoring only a second type of control channel when the UE is in a second state which is transited from the first state.

In an embodiment of the method, configuration information of the second type of control channel is included in the data required by the UE in the first state, and the method further comprises: if second control information which indicates data required by the UE in the second state on the data channel is detected on the second type of control channel, decoding the second control information in order to obtain the data required by the UE in the second state on the data channel.

In an embodiment of the method, the configuration information of the second type of control channel is obtained before the UE enters the second state from the first state.

According to another aspect of the present disclosure, a UE is provided. The UE comprises: a monitoring unit, configured to monitor only a first type of control channel in a first state of the UE; and a decoding unit, configured to, if first control information which indicates data required by the UE in the first state on a data channel is detected on the first type of control channel, decode the first control information in order to obtain the data required by the UE in the first state on the data channel; wherein the monitoring unit is further configured to monitor only a second type of control channel when the UE is in a second state which is transited from the first state.

In an embodiment of the UE, configuration information of the second type of control channel is included in the data required by the UE in the first state, and wherein the decoder is further configured to, if second control information which indicates data required by the UE in the second state on the data channel is detected on the second type of control channel, decode the second control information, in order to obtain the data required by the UE in the second state on the data channel.

In an embodiment of the UE, the configuration information of the second type of control channel is obtained, before the UE enters the second state from the first state.

According to another aspect of the present disclosure, a UE is provided. The UE comprises: a communication interface arranged for wireless communication, one or more processors, and a memory including instructions which, when executed by said one or more processors, cause said UE to: monitor only a first type of control channel in a first state of the UE; and if first control information which indicates data required by the UE in the first state on a data channel is detected on the first type of control channel, decode the first control information, in order to obtain the data required by the UE in the first state on the data channel; and monitor only a second type of control channel when the UE is in a second state which is transited from the first state.

In an embodiment of the UE, configuration information of the second type of control channel is included in the data required by the UE in the first state, and wherein the memory further includes instructions which, when executed by said one or more processors, cause the UE to: if second control information which indicates data required by the UE in the second state on the data channel is detected on the second type of control channel, decode the second control information, in order to obtain the data required by the UE in the second state on the data channel.

In an embodiment of the UE, the configuration information of the second type of control channel is obtained, before the UE enters the second state from the first state.

The technical solutions of the present disclosure may at least have beneficial effects as follows.

By providing the downlink control channel configuration and transmission mechanism at the network node side and the downlink control channel monitoring mechanism at the UE side, the UE only needs to monitor one type of downlink control channel in any one of its states. Therefore, the disadvantages such as wasting battery power of the UE which monitors more than one downlink control channel in one state as previously discussed may be alleviated. Also, since the UE monitoring more than one downlink control channel in one state requires the UE to perform a substantial amount of processing (even worse than multiple hypotheses on e.g. LTE PDCCH due to a separation between the synchronization signal and related processing for the different entities), which implies that multiple synchronizations and multiple Fast Fourier Transforms (FFTs) as well as multiple channel estimation processing are needed on top of blind decoding attempts on PDCCH for the different types of downlink control channels from different logical entities, the UE only monitoring one type of downlink control channel in one state may also reduce complexity of processing at the UE side, and hence reduce cost of the UE accordingly.

BRIEF DESCRIPTION OF THE DRAWINGS

The objects, advantages and characteristics of the present disclosure will be more apparent, according to descriptions of preferred embodiments in connection with the drawings, on which.

Figure 1:
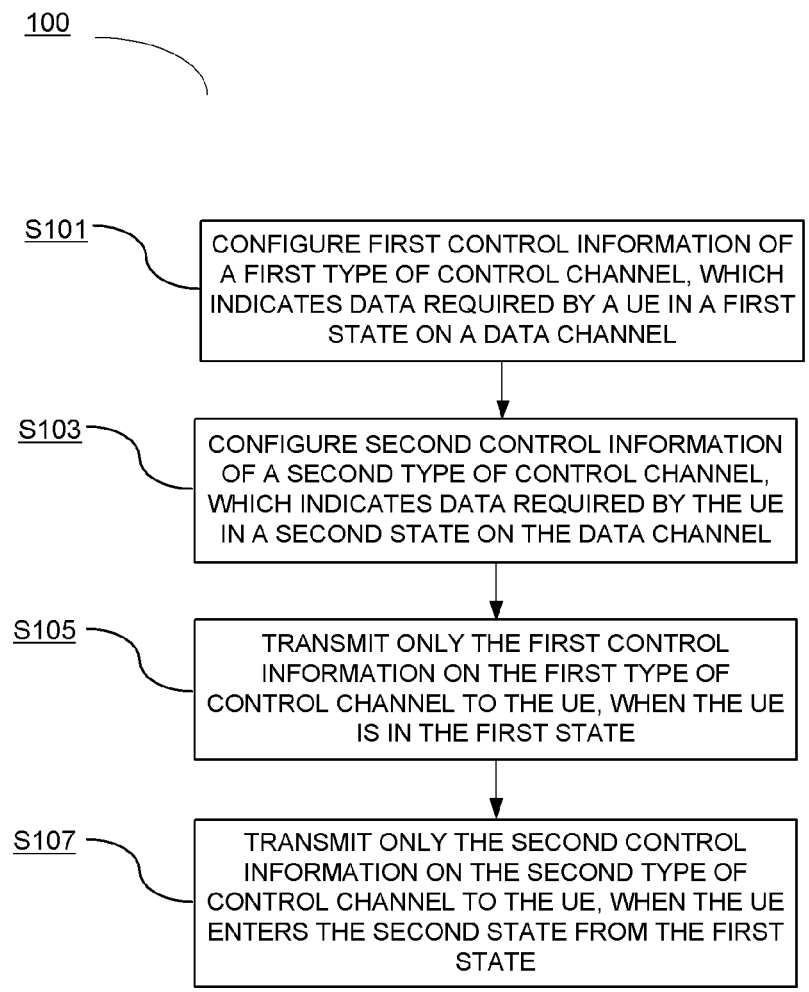
FIG. 1 illustratively shows a flowchart of a control channel configuration and transmission method according to an embodiment of the present disclosure.

It should be noted that various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e. the $5^{th}$ generation of wireless communication network. However, it will be appreciated by the skilled in the art that the techniques described herein may also be used for other wireless networks such as LTE and corresponding radio technologies mentioned herein as well as wireless networks and radio technologies proposed in the future.

Since the next generation of wireless communication network is evolved from LTE, some of LTE terms are continuous to be used in much of the description below.

As used herein, the term "network node" refers to any of entities capable of accessing to any of wireless communication networks. By way of example and not limitation, the network node may comprise a base station (BS), a node B (NodeB or NB), an evolved NodeB (eNodeB or eNB), and so forth.

The term "UE" used herein refers to any device that can access a wireless communication network and receive services therefrom. By way of example, a UE may include, but is not limited to, a mobile phone, a cellular phone, a smart phone, a tablet, a wearable device, a personal digital assistant (PDA), and the like.

Hereinafter, "control channel" is used to refer to "downlink control channel", an example of which is PDCCH; and "control information" is used to refer to "downlink control information" for simplicity, unless otherwise specified.

The basic principles of the present disclosure consist in that
  at the UE side, when the UE is in any state, the UE only needs to monitor one type of control channel and decodes the control information of this specific type of control channel, in order to obtain all of the data on the data channel required by the UE in its current state, while does not need to monitor another type of control channel; and
  at the network node side, different types of control channels are configured to carry control information indicating all of data on a data channel required by the UE in different states respectively, and only the control information on one type of control channel is transmitted to the UE in its current state.

In a scenario in which the present disclosure may be applied, the UE is configured by the network node with more than one type of control channel, e.g., a broadcast (i.e., non-UE-dedicated) control channel, and a UE-dedicated control channel, etc.

In order to fulfill the above basic principles of the present disclosure, it is proposed that in the $5^{th}$ generation, system information can be transmitted to the UE via the UE-dedicated control channel, which is more effective compared to be transmitted via the broadcast control channel. The UE-dedicated control channel in the $5^{th}$ generation or later generations may be named as E-PDCCH (as it is in LTE) or others, while in essence the control channel is UE specific. For the UE in the RRC_Active state, although it needs to receive system information, it does not need to monitor the broadcast control channel (which is called a non-active-mode control channel below) to receive the system information as in LTE. Instead, the system information can be transmitted to the UE via the UE-dedicated control channel (which is called an active-mode control channel below). In addition, it is proposed that for the UE in the RRC_Dormant state, a paging message is transmitted to the UE via the active-mode control channel. Since a delay to receive data on the data channel after the UE is switched from the RRC_Dormant state to the RRC_Active state can satisfy a requirement on $5^{th}$ generation (the requirement on $5^{th}$ generation for now being 10 ms), it is good enough to just let the UE in the RRC_Dormant state to receive the paging message via the non-active-mode control channel.

The present disclosure introduces a method regarding control information of which type of control channel being decoded by the UE in which of states. In particular, If the UE is in an active state (e.g., the RRC_Active state), it decodes control information of a set of active-mode control channels (e.g., of active-mode PDCCHs), e.g., activates search spaces for the set of active-mode control channels; and If the UE is in a non-active state (e.g. the RRC_Dormant state, the RRC_Idle state), it decodes control information of a set of non-active-mode control channels (e.g., of non-active-mode PDCCHs), e.g., activates search spaces for the set of non-active-mode control channels.

To decode control information of a control channel or to activate a search space for a control channel implies trying to receive an associated synchronization signal;
attempting to perform a channel estimation using an associated DMRS; and
attempting to decode a control channel using one or more blind decodes.

The active-mode control channels are primarily used by the UE for receiving node-related data (e.g. user-plane information from one or more nodes in dedicated search spaces; UE-dedicated system information sent from a serving node; control signaling from a serving node in a common search space etc.); and the non-active-mode control channels are primarily used by the UE for receiving system-related data on the data channel (e.g. Random Access Radio (RAR), paging, tracking information, common system information etc., which may come from multiple nodes).

The present disclosure also proposes that downlink configuration information of the active-mode control channel is included in data (e.g., MSG2, MSG4, RRC reconfiguration message) on the data channel which are indicated by the control information of the non-active-mode control channel, or by using an existing active-mode control channel of which the control information indicates the data channel which contains an updated configuration information of the active-mode control channel; and configuration information of the non-active-mode control channel is included in system information in e.g. a Common-Access Information Table (C-AIT) or a System Signature Block (SSB) or a Master Information Block (MIB)); or in RRC reconfiguration message on the data channel which are indicated by the control information of the active-mode control channel.

Hereinafter, a flowchart of a control channel configuration and transmission method according to an embodiment of the present disclosure will be described with reference to FIG. 1.

As shown in FIG. 1, the method 100 performed at a network node may comprise steps S101-S107, in which steps S101 and S103 are control channel configuration steps, and steps S105 and S107 are control channel transmission steps.

The network node may configure, in the configuration steps, control information of different types of control channels simultaneously or successively. The control information of different types of control channels indicate all of data on data channels required by the UE in corresponding states, respectively. In particular, the network node may configure, in step S101, first control information of a first type of control channel, which indicates data required by the UE in a first state on the data channel; and configure, in step S103, second control information of a second type of control channel, which indicates data required by the UE in a second state on the data channel.

The first type of control channel may be any one of a non-active-mode control channel and an active-mode control channel, and the second type of control channel may be any another one of the non-active-mode control channel and the active-mode control channel. Accordingly, control information of the non-active-mode control channel indicates non-UE-dedicated data on the data channel, and control information of the active-mode control channel indicates UE-dedicated data on the data channel.

The first state and the second state of the UE may be any two of the RRC_Idle state, the RRC_Dormant state and the RRC_Active state which are possible to be transited from the first state to the second state. As appreciated by the skilled in the art, the RRC_Idle state may be transited directly from/to the RRC_Active state, and the RRC_Dormant state may be transited directly from/to the RRC_Active state. Hence, the first state of the UE may be either of the RRC_Idle or RRC_Dormant state and the RRC_Active state, and the second state of the UE may be the other of the RRC_Idle or RRC_Dormant state and the RRC_Active state. That is, the first state of the UE may be the RRC_Idle or RRC_Dormant state, and the second state of the UE may be the RRC_Active state; or the first state of the UE may be the RRC_Active state, and the second state of the UE may be the RRC_Idle or RRC_Dormant state.

The data required by the UE in the RRC_Idle state and the RRC_Dormant state may be referred to as non-UE-dedicated data, which are indicated by the control information of the non-active-mode control channel; and the data required by the UE in the Active state may be referred to as UE-dedicated data, which are indicated by the control information of the active-mode control channel.

It should be understood by the skilled in the art that although steps S101 and S103 are indicated in serial numbers, it in no way means that steps S101 and S103 are performed in an order of the serial numbers. Instead, steps S101 and S103 may be performed simultaneously or successively in any order.

After the first control information of the first type of control channel is configured in step S101 by the network node, when the UE is in the first state, the network node may transmit, in step S105, only the first control information on the first type of control channel to the UE, regardless of whether the second control information of the second type of control channel is configured. When the UE enters the second state from the first state, the network node may transmit, in step S107, only the second control information on the second type of control channel to the UE.

Here, configuration information of the second type of control channel is included in the data required by the UE in the first state which are indicated by the first control information of the first type of control channel, before the UE enters the second state from the first state.

For example, if the UE enters the RRC_Active state from the RRC_Idle state, configuration information of the active-mode control channel may be included in the data indicated by the control information of the non-active-mode control channel, e.g., MSG2 and/or MSG4, or a RRC reconfiguration message etc.; if the UE enters the RRC_Dormant state from the RRC_Active state, configuration information of the non-active-mode control channel may be included in the data indicated by the control information of the active-mode control channel, e.g. a dedicated RRC signaling message; if the UE enters the RRC_Active state from the RRC_Dormant state, configuration information of the active-mode control channel may be included in the data indicated by the control information of the non-active-mode control channel, e.g., MSG2 and/or MSG4 etc.; if the UE enters the RRC_Idle state from the RRC_Active state, configuration information of the non-active-mode control channel may be included in the data indicated by the control information of the active-mode control channel, e.g. the dedicated RRC signaling message.

Thus, the UE may know configuration of the second type of control channel before it enters the second state from the first state, so that the UE may monitor the second type of control channel once it enters the second state from the first state.

In another implementation, configuration information of the second type of control channel may be included in the data required by the UE in the first state which are indicated by the first control information of the first type of control channel, when or after the UE enters the second state from the first state. In this case, when the UE enters the second state from the first state, firstly it needs to obtain configuration information of the second type of control channel from the data required by the UE in the first state which are indicated by the first control information of the first type of control channel. Hence, after the UE enters the second state from the first state, the UE still needs to monitor the first type of control channel until it obtains the configuration information of the second type of control channel from the data required by the UE in the first state which are indicated by the first control information of the first type of control channel. After the configuration information of the second type of control channel is obtained by the UE, the UE may switch to monitor the second type of control channel from monitoring the first type of control channel. What the present variant implementation and the above implementation have in common consists in that at any moment, only one type of control channel is required to be monitored by the UE, which may reduce the power consumption and cost of the UE. The difference is in that the present variant implementation may have a higher complexity of processing at the UE side than that of the above implementation.

It should also be understood by the skilled in the art that although steps S103 and S105 are indicated in serial numbers, it in no way means that steps S103 and S105 are performed in an order of the serial numbers. Instead, steps S103 and S105 may be performed simultaneously or successively in any order. It is only required in embodiments of the present disclosure that steps S101 and S105 are performed sequentially, steps S103 and S107 are performed sequentially, and step S107 is not performed until the UE enters the second state from the first state.

Figure 2:
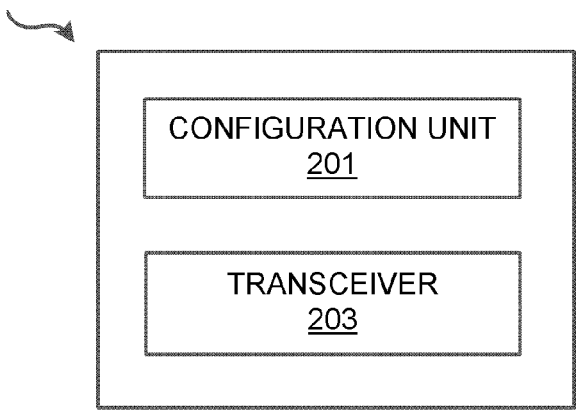
FIG. 2 illustratively shows a schematic structure diagram of a network node according to an embodiment of the present disclosure.

A structure of a network node will be described with reference to FIG. 2. FIG. 2 illustratively shows a schematic structure diagram of a network node 200 according to an embodiment of the present disclosure. The network node 200 in FIG. 2 may perform the method 100 described previously with reference to FIG. 1.

As shown in FIG. 2, the network node 200 comprises a configuration unit 201 and a transceiver 203. As will be understood by the skilled in the art, common components in the network node 200 are omitted in FIG. 2 for not obscuring the idea of the present disclosure.

In particular, the configuration unit 201 is arranged to configure, in step S101, first control information of a first type of control channel, which indicates data required by a UE in a first state on a data channel; and configure, in step S103, second control information of a second type of control channel, which indicates data required by the UE in a second state on the data channel.

The transceiver 203 is arranged to transmit, in step S105, only the first control information on the first type of control channel to the UE, when the UE is in the first state; and transmit, in step S107, only the second control information on the second type of control channel to the UE, when the UE enters the second state from the first state.

Accordingly, a flowchart of a control channel monitoring method according to an embodiment of the present disclosure will be described with reference to FIG. 3.

Figure 3:
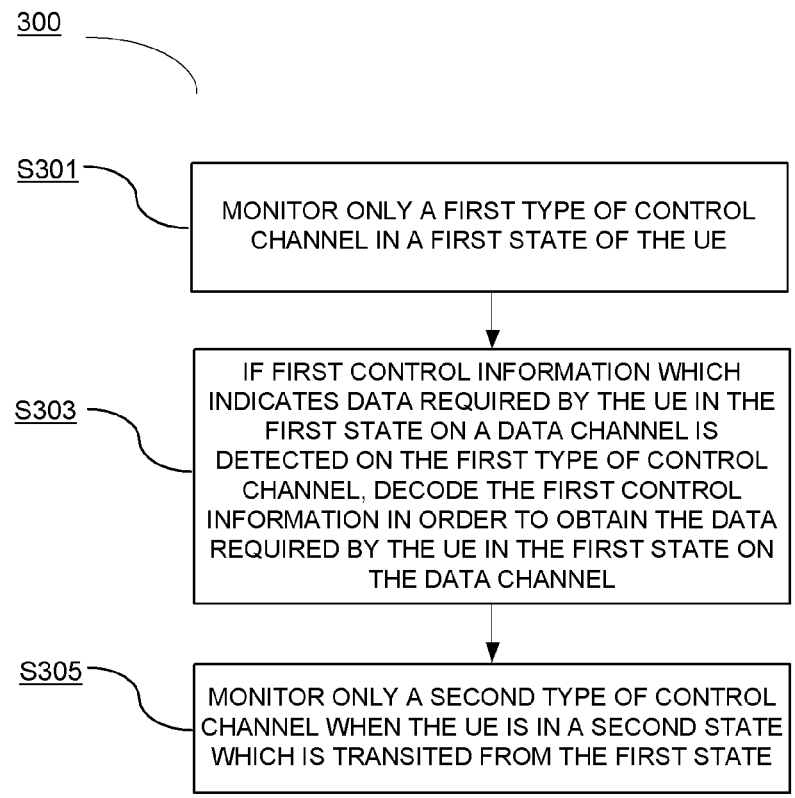
FIG. 3 illustratively shows a flowchart of a control channel monitoring method according to an embodiment of the present disclosure.

As shown in FIG. 3, the method 300 performed at a UE may comprise steps S301 to S305.

In step S301, the UE monitors only a first type of control channel when the UE is in a first state.

Once first control information which indicates data required by the UE in the first state on a data channel is detected on the first type of control channel, the UE decodes the first control information in step S303, in order to obtain the data required by the UE in the first state on the data channel.

When the UE enters a second state from the first state, the UE switches to monitor, in step S305, only a second type of control channel from monitoring only the first type of control channel. Thus, the UE only needs to monitor the second type of control channel, when it is in the second state.

The first type of control channel may be any one of a non-active-mode control channel and an active-mode control channel, and the second type of control channel may be any another one of the non-active-mode control channel and the active-mode control channel. Accordingly, control information of the non-active-mode control channel indicates non-UE-dedicated data on the data channel, and control information of the active-mode control channel indicates UE-dedicated data on the data channel.

The first state and the second state of the UE may be any two of the RRC_Idle state, the RRC_Dormant state and the RRC_Active state which are possible to be transited from the first state to the second state. As appreciated by the skilled in the art, the RRC_Idle state may be transited directly from/to the RRC_Active state, and the RRC_Dormant state may be transited directly from/to the RRC_Active state. Hence, the first state of the UE may be either of the RRC_Idle or RRC_Dormant state and the RRC_Active state, and the second state of the UE may be the other of the RRC_Idle or RRC_Dormant state and the RRC_Active state. That is, the first state of the UE may be the RRC_Idle or RRC_Dormant state, and the second state of the UE may be the RRC_Active state; or the first state of the UE may be the RRC_Active state, and the second state of the UE may be the RRC_Idle or RRC_Dormant state.

The data required by the UE in the RRC_Idle state and the RRC_Dormant state may be referred to as non-UE-dedicated data, which are indicated by the control information of the non-active-mode control channel; and the data required by the UE in the Active state may be referred to as UE-dedicated data, which are indicated by the control information of the active-mode control channel.

Here, configuration information of the second type of control channel is included in the data required by the UE in the first state which are indicated by the first control information of the first type of control channel, before the UE enters the second state from the first state.

For example, if the UE enters the RRC_Active state from the RRC_Idle state, configuration information of the active-mode control channel may be included in the data indicated by the control information of the non-active-mode control channel, e.g., MSG2 and/or MSG4, or a RRC reconfiguration message etc.; if the UE enters the RRC_Dormant state from the RRC_Active state, configuration information of the non-active-mode control channel may be included in the data indicated by the control information of the active-mode control channel, e.g. the dedicated RRC signaling message; if the UE enters the RRC_Active state from the RRC_Dormant state, configuration information of the active-mode control channel may be included in the data indicated by the control information of the non-active-mode control channel, e.g., MSG2 and/or MSG4 etc.; if the UE enters the RRC_Idle state from the RRC_Active state, configuration information of the non-active-mode control channel may be included in the data indicated by the control information of the active-mode control channel, e.g. the dedicated RRC signaling message.

Thus, the UE may know configuration of the second type of control channel before it enters the second state from the first state, so that the UE may monitor the second type of control channel once it enters the second state from the first state.

In another implementation, configuration information of the second type of control channel may be included in the data required by the UE in the first state which are indicated by the first control information of the first type of control channel, when or after the UE enters the second state from the first state. In this case, when the UE enters the second state from the first state, firstly it needs to obtain configuration information of the second type of control channel from the data required by the UE in the first state which are indicated by the first control information of the first type of control channel. Hence, after the UE enters the second state from the first state, the UE still needs to monitor the first type of control channel until it obtains the configuration information of the second type of control channel from the data required by the UE in the first state which are indicated by the first control information of the first type of control channel. After the configuration information of the second type of control channel is obtained by the UE, the UE may switch to monitor the second type of control channel from monitoring the first type of control channel. What the present variant implementation and the above implementation have in common consists in that at any moment, only one type of control channel is required to be monitored by the UE, which may reduce the power consumption and cost of the UE. The difference is in that the present variant implementation may have a higher complexity of processing at the UE side than that of the above implementation.

Figure 4:
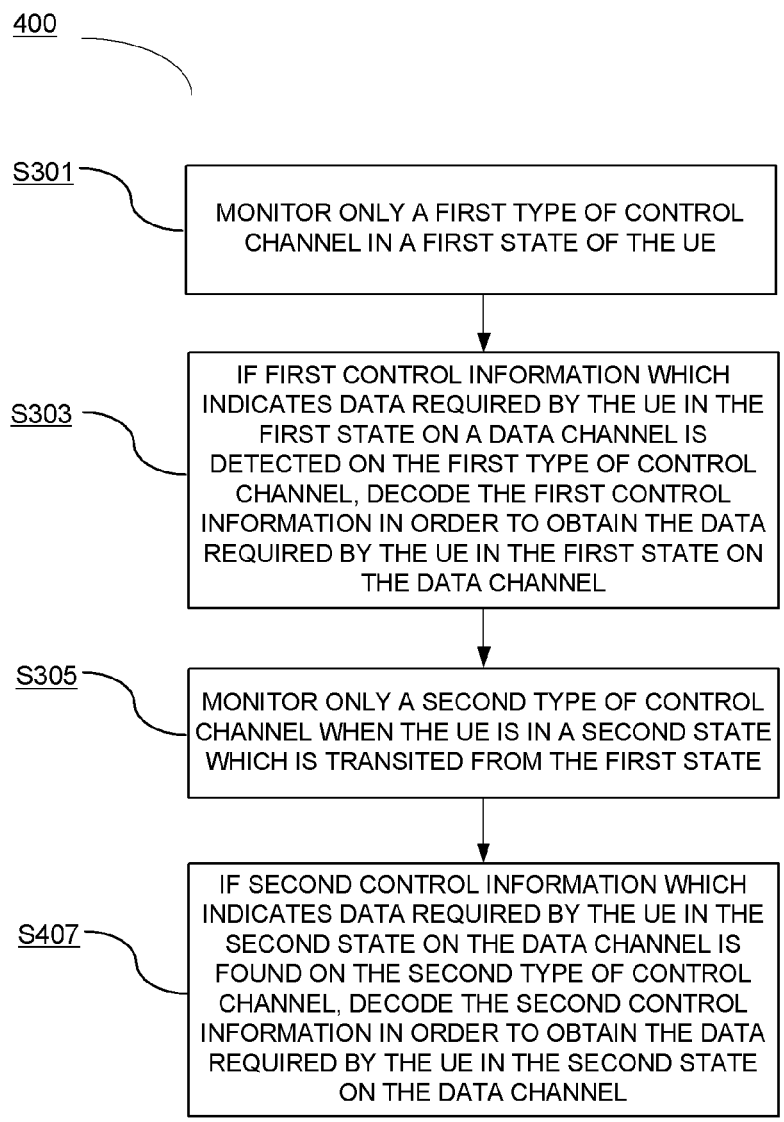
FIG. 4 illustratively shows a flowchart of a control channel monitoring method according to another embodiment of the present disclosure.

Hereinafter, a flowchart of a control channel monitoring method according to another embodiment of the present disclosure will be described with reference to FIG. 4. As shown in FIG. 4, the method 400 performed at the UE may comprise steps S301 to S305 and S407. Steps in FIG. 4 with same reference numbers S301 to S305 are completely identical with those in FIG. 3, the description thereof thus being omitted for simplicity.

In the present embodiment, if second control information which indicates data required by the UE in the second state on the data channel is detected on the second type of control channel, the method 400 may further comprises step S407, in which the UE decodes the second control information in order to obtain the data required by the UE in the second state on the data channel.

Figure 5:
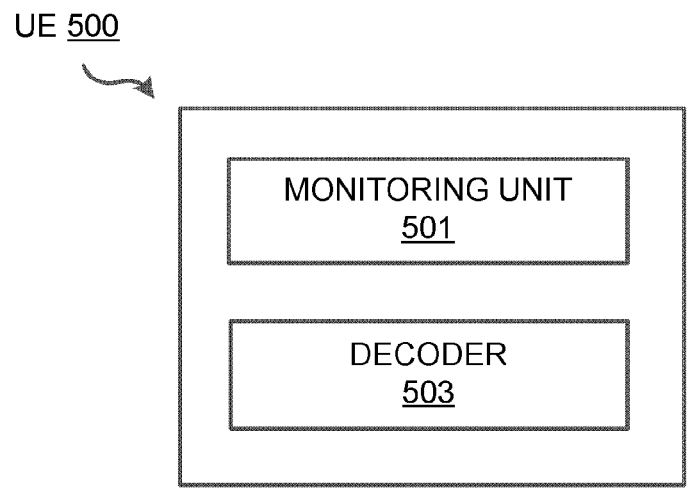
FIG. 5 illustratively shows a schematic structure diagram of a UE according to an embodiment of the present disclosure.

Hereinafter, a structure of a UE will be described with reference to FIG. 5. FIG. 5 illustratively shows a schematic structure diagram of a UE 500 according to an embodiment of the present disclosure. The UE 500 in FIG. 5 may perform the methods 300 and 400 described previously with reference to FIGS. 3 and 4.

As shown in FIG. 5, the network node 200 comprises a monitoring unit 501 and a decoder 503. As will be understood by the skilled in the art, common components in the UE 500 are omitted in FIG. 5 for not obscuring the idea of the present disclosure.

In particular, the monitoring unit 501 is arranged to monitor, in step S301, only a first type of control channel in a first state of the UE. If first control information which indicates data required by the UE in the first state on a data channel is detected by the monitoring unit 501 on the first type of control channel, the decoder 503 decodes, in step S503, the first control information, in order to obtain the data required by the UE in the first state on the data channel. Here, configuration information of the second type of control channel is included in the data required by the UE in the first state which are indicated by the first control information of the first type of control channel, before the UE enters the second state from the first state. Thus, the UE may obtain the configuration information of the second type of control channel by the decoder 503 decoding the first control information, before the UE enters the second state from the first state. Once the UE 500 enters a second state from the first state, the monitoring unit 501 switches to monitor, in step S305, only a second type of control channel. Thus, when the UE 500 is in the second state, the monitoring unit 501 only needs to monitor the second type of control channel.

Further, if second control information which indicates data required by the UE in the second state on the data channel is detected by the monitoring unit S501 on the second type of control channel, the decoder 503 decodes, in step S407, the second control information, in order to obtain the data required by the UE in the second state on the data channel.

As previously discussed, in another implementation, configuration information of the second type of control channel may be included in the data required by the UE in the first state which are indicated by the first control information of the first type of control channel, when or after the UE enters the second state from the first state. Thus, the UE may obtain the configuration information of the second type of control channel by the decoder 503 decoding the first control information, when or after the UE enters the second state from the first state.

Figure 6:
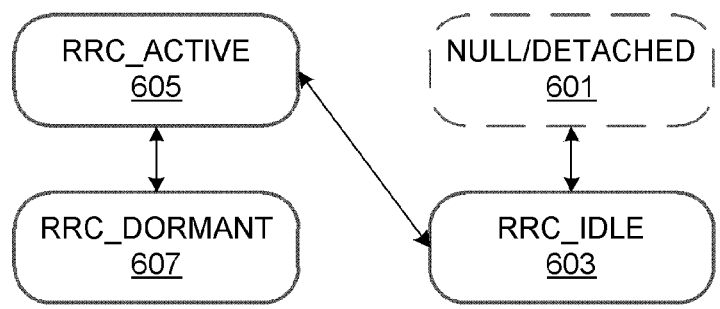
FIG. 6 illustratively shows a schematic diagram of state transition among respective states of an UE according to an embodiment of the present disclosure.

Hereinafter, an exemplary procedure for the UE 500 monitoring different types of control channels respectively in different states according to an embodiment of the present disclosure will be described in detail with reference to FIG. 6. FIG. 6 illustratively shows a schematic diagram of state transition among respective states of the UE 500. It can be seen from FIG. 6 that the RRC_Idle state 603 can neither be transited directly from/to the RRC_Active state 605, nor be transited directly from/to the RRC_Dormant state 607.

As shown in FIG. 6, when the UE 500 powers on, its RRC state will change from NULL 601 to RRC_Idle 603. During this transition period, the UE 500 will decodes by the decoder 503 to obtain configuration information of the non-active-mode control channel from system information which is transmitted from the network node 300 e.g. via C-AIT or SSB or MIB. Once the UE 500 obtains the non-active-mode control channel configurations, the UE 500 can use the monitoring unit 501 to monitor, in the RRC_Idle state 603, the non-active-mode control channel. If control information which indicates data required by the UE 500 in the RRC_Idle state 603 (i.e., non-UE-dedicated data) is detected on the non-active-mode control channel, the UE 500 decodes by the decoder 503 the control information of the non-active-mode control channel, in order to obtain data required in the RRC_Idle state 603, e.g., MSG2 and/or MSG4 for an initial random access procedure. Besides serving as the normal random access procedure, MSG2 and MSG4 at the same time may include configuration information of the active-mode control channel to configure the active-mode control channel. It is also possible that UE 500 obtains the configuration information of the active-mode control channel from a RRC reconfiguration message using the non-active-mode control channel, so that once the UE switches to the RRC_Active state 605 from the RRC_Idle state 603, it can start to monitor the active-mode control channel in the RRC_Active state 605; and if control information which indicates data required in the RRC_Active state 605 (i.e., UE-dedicated data) is detected, it can decode the control information of the active-mode control channel, in order to obtain the UE-dedicated data indicated by the active-mode control channel. The active-mode control channel can be updated later by a RRC message with an existing active-mode control channel.

If the UE 500 is inactivity for a certain duration in the RRC_Active state 605 and satisfy a criterion to switch to the RRC_Dormant state 607, the UE 500 may decode by the decoder 503 to obtain updated configuration information of the non-active-mode control channel from the UE-dedicated data indicated by the active-mode control channel, e.g. the RRC dedicated signaling message. Once the UE 500 knows the updated non-active-mode control channel configurations, the UE 500 can use the monitoring unit 501 to monitor, in the RRC_Dormant state 607, the non-active-mode control channel. If control information which indicates data required by the UE 500 in the RRC_Dormant state 607 (i.e., non-UE-dedicated data) is detected on the non-active-mode control channel, the UE 500 decodes by the decoder 503 the control information of the non-active-mode control channel, in order to obtain data required in the RRC_Dormant state 607, e.g., MSG2 and/or MSG4.

During the UE 500 transits from the RRC_Dormant state 607 to the RRC_Active state 605, the UE 500 may obtain updated configuration information of the active-mode control channel from data required in the RRC_Dormant state 607 (i.e., non-UE-dedicated data), e.g., MSG2 and/or MSG4, a RRC reconfiguration message, so that once the UE switches to the RRC_Active state 605 from the RRC_Dormant state 607, it can start to monitor the active-mode control channel in the RRC_Active state 605; and if control information which indicates data required in the RRC_Active state 605 (i.e., UE-dedicated data) is detected, it can decode the control information of the active-mode control channel, in order to obtain the UE-dedicated data indicated by the active-mode control channel.

Therefore, according to the embodiments of the present disclosure, one of the UE states corresponds to one of types of control channels. In particular, either the RRC_Idle state or the RRC_Dormant state corresponds to the non-active-mode control channel, and the RRC_Active state corresponds to the active-mode control channel. Further, configuration information of the second type of control channel is obtained in the first state of the UE by means of the first type of control channel, so that the UE can start to monitor the second type of control channel once it transits to the second state from the first state.

Figure 7:
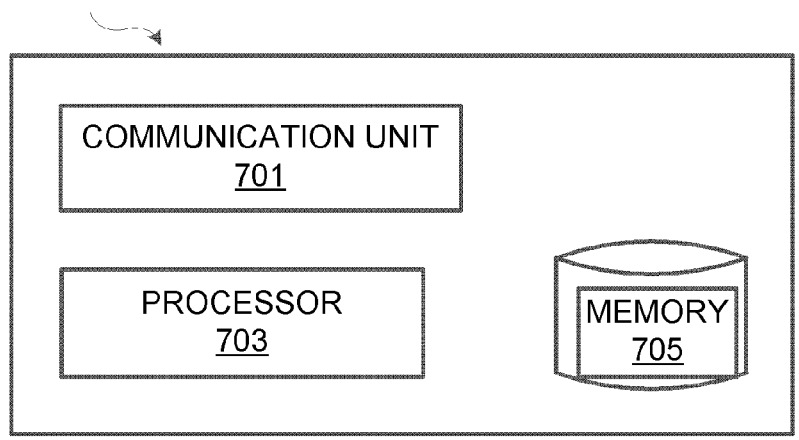
FIG. 7 illustratively shows a schematic structure diagram of a network node according to another embodiment of the present disclosure.

Hereinafter, another structure of a network node will be described with reference to FIG. 7. FIG. 7 illustratively shows a schematic structure diagram of a network node according to another embodiment of the present disclosure. The network node 700 in FIG. 7 may perform the method 100 described previously with reference to FIG. 1.

As shown in FIG. 7, the network node 700 comprises at least one controller or processor 703 comprising e.g., any suitable Central Processing Unit, CPU, microcontroller, Digital Signal Processor, DSP, etc., capable of executing computer program code. The computer program code may be stored in a memory 705. The memory 705 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example network node 700 further comprises a communication interface 701 arranged for wireless communication with other devices or nodes, such as a UE served by the network node.

The computer program code, when loaded from the memory 705 and run in the processor 703, causes network node 700 to perform the methods according to the disclosure, such as the method 100 as previously described. In an embodiment, the computer program code, when executed, cause network node 700 to configure, in step S101, first control information of a first type of control channel, which indicates data required by a user equipment UE in a first state on a data channel; and configure, in step S103, second control information of a second type of control channel, which indicates data required by the UE in a second state on the data channel; and transmit, in step S105, only the first control information on the first type of control channel to the UE, when the UE is in the first state; and transmit, in step S107, only the second control information on the second type of control channel to the UE, when the UE enters the second state from the first state.

Figure 8:
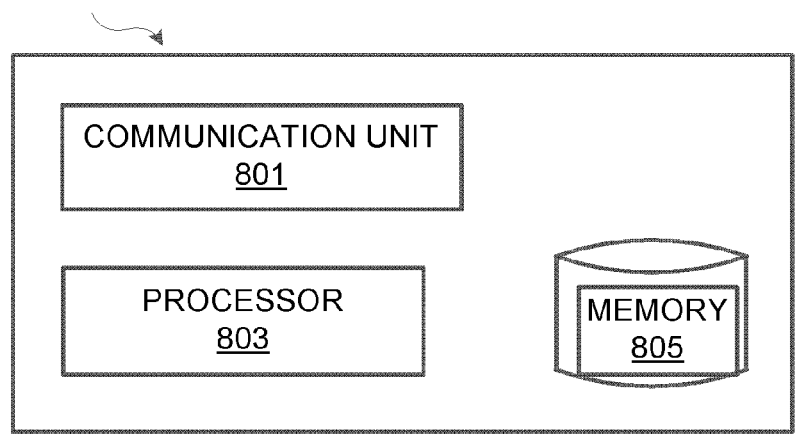
FIG. 8 illustratively shows a schematic structure diagram of a UE according to another embodiment of the present disclosure.

Hereinafter, another structure of a UE will be described with reference to FIG. 8. FIG. 8 illustratively shows a schematic structure diagram of a UE according to another embodiment of the present disclosure. The UE 800 in FIG. 8 may perform the methods 300 and 400 described previously with reference to FIGS. 3 and 4.

As shown in FIG. 8, the UE 800 comprises at least one controller or processor 703 comprising e.g., any suitable Central Processing Unit, CPU, microcontroller, Digital Signal Processor, DSP, etc., capable of executing computer program code. The computer program code may be stored in a memory 805. The memory 805 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example UE 800 further comprises a communication interface 801 arranged for wireless communication with other devices or nodes, such as the network node serving the UE.

The computer program code, when loaded from the memory 805 and run in the processor 803, causes the UE 800 to perform the methods according to the disclosure, such as the methods 300 and 400 as previously described.

In an embodiment, the computer program code, when executed, cause the UE 800 to monitor, in step S301, only a first type of control channel in a first state of the UE; and if first control information which indicates data required by the UE in the first state on a data channel is detected on the first type of control channel, decode, in step S303, the first control information, in order to obtain the data required by the UE in the first state on the data channel; and monitor, in step S305, only a second type of control channel when the UE 800 is in a second state which is transited from the first state.

Configuration information of the second type of control channel is included in the data required by the UE 800 in the first state. The memory 805 further includes instructions which, when executed by said one or more processors 803, cause the UE 800 to: if second control information which indicates data required by the UE 800 in the second state on the data channel is detected on the second type of control channel, decode, in step S407, the second control information, in order to obtain the data required by the UE in the second state on the data channel.

According to foregoing embodiments of the disclosure, the disclosure has at least the following advantages:

By providing the control channel configuration and transmission mechanism at the network node side and the control channel monitoring mechanism at the UE side as illustrated above, the UE only needs to monitor one type of control channel in any one of its states. Therefore, complexity of processing at the UE side may be reduced, and hence power consumption and cost of the UE may be reduced accordingly.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A network node, comprising:
 a communication interface arranged for wireless communication,
 one or more processors, and
 a memory including instructions which, when executed by said one or more, processors, cause said network node to:
  configure first control information of a first type of control channel, which indicates first data required by a user equipment UE in a first state on a data channel; and configure second control information of a second type of control channel, which indicates second data required by the UE in a second state on the data channel, wherein the first data required by the UE in the first state comprises configuration information of the second type of control channel before the UE enters the second state from the first state; and
  transmit only the first control information on the first type of control channel to the UE, when the UE is in the first state; and transmit only the second control information on the second type of control channel to the UE, when the UE enters the second state from the first state.

2. The network node according to claim 1, wherein the first state of the UE is either of an idle or Dormant state and an Active state, and the second state of the UE is the other of the Idle or Dormant state and the Active state and wherein data required by the UE in the idle state and the Dormant state are non-UE-dedicated data indicated by the control information of the non-active-mode control channel, and data require by the UE in the Active state are UE-dedicated data indicated by the control information of the active-mode control channel.

3. The network node according to claim 2, wherein the configuration information of the non-active-mode control channel is included in system information or in a radio resource control RRC reconfiguration message indicated by the active-mode control channel; and the configuration information: of the active-mode control channel is included in a random access signaling or in a RRC reconfiguration message indicated by the non-active mode control channel.

4. A method at a user equipment UE, comprising;
monitoring only a first type of control channel in a first state the of the UE;
if first control information which indicates first data required by the UE, in the first state on a data channel is detected on the first type of control channel, decoding the first control information in order to obtain the first data required by the UE in the first state on the data channel, wherein the first data required by the UE in the first state comprises configuration information of a second type of control channel before the UE enters a second state from the first state; and
monitoring only the second type of control channel when the UE is in the second state which is transited from the first state.

5. The method according to claim 4, wherein the method further comprises:
if second control information which indicates second data required by the UE in the second state on the data channel is detected on the second type of control channel, decoding the second control information in order to obtain the second data required by the UE in the second state on the data channel.

6. The method according to claim 4, wherein the first state of the UE is either of an Idle or Dormant state and an Active state, and the second state of the UE is the other of the Idle or Dormant state and the Active state and wherein data required by the UE in the idle state and the Dormant state are non-UE-dedicated data indicated by the control information of the non-active-mode control channel, and data required by the UE the Active state are UE-dedicated data indicated by the control information of the active-mode control channel.

7. The method according to claim 6, wherein the configuration information of the non-active-mode control channel is included in system information or in a radio resource control RRC reconfiguration message indicated by the active-mode control channel; and the configuration information of the active-mode control channel is included in a random access signaling or in a RRC reconfiguration message indicated by the non-active mode control channel.

8. A user equipment, UE, comprising:
a communication interface arranged for wireless communication,
one or more processors, and
a memory including instructions which, when executed by said one or more processors, cause said UE to;
monitor only a first type of control channel in a first state of the UE; and
if first control information which indicates first data required by the UE in the first state on a data channel is detected on the first type of control channel, decode the first control information, in order to obtain the first data required by the UE in the first state on the data channel wherein the first data required by the UE in the first state comprises configuration information of a second type of control channel before the UE enters a second state from the first state; and
monitor only the second type of control channel when the UE is in the second state which is transited from the first state.

9. The UE according to claim 8, wherein the memory further includes instructions which, when executed by said one or more processors, cause the UE to:
if second control information which indicates second data required by the UE in the second state on the data channel is detected on the second type of control channel, decode the second control information in order to obtain the second data required by the UE in the second state on the data channel.

10. The UE according to claim 8, wherein the first state of the UE is either of an Idle or Dormant state and an Active state, and the second state of the UE is the other of the Idle or Dormant state and the Active slate, and wherein data required by the UE in the Idle state and the Dormant state are non-UE-dedicated data indicated by the control information of the non-active-mode control channel, and data required by the UE in the Active state are UE-dedicated data indicated by the control information of the active-mode control channel.

11. The UP according to claim 10, wherein the configuration information of the non-active-mode control channel is included in system information or in a radio resource control RRC reconfiguration message indicated by the active-mode control channel; and
the configuration in of the active-mode control channel is included in a random access signaling or in a RRC reconfiguration message indicated by the non-active-mode control channel.

* * * * *